Sept. 23, 1952            R. H. LEE            2,611,809

CONTROL SWITCHING SYSTEM FOR AUTOMATIC EXPOSURE TIMERS

Original Filed Oct. 9, 1946            2 SHEETS—SHEET 1

*INVENTOR.*
ROBERT H. LEE
BY
ATTY.

Patented Sept. 23, 1952

2,611,809

UNITED STATES PATENT OFFICE 2,611,809

CONTROL SWITCHING SYSTEM FOR AUTOMATIC EXPOSURE TIMERS

Robert H. Lee, Indianapolis, Ind., assignor, by mesne assignments, to Micro Recording Company, a corporation of Florida Original application October 9, 1946, Serial No. 702,124. Divided and this application July 5, 1947, Serial No. 759,205

12 Claims. (Cl. 175—321)

My invention relates to improvements in means for electromagnetically operating a plurality of switches, which are adapted for successive operation.

It is one of the objects of my invention to provide means for controlling the successive operation of a plurality of electromagnetically operated switches as to cause said switches to operate in a predetermined sequence.

A further object of my invention is the provision of a plurality of magnetically operated switches adapted for successive operation and the control of said successive operation through the operation of a plurality of tubes, each including a cathode, an anode and a grid, said tubes being so arranged and connected as to be successively energized to control the energization of the electromagnetically operated switches and the operation of said tubes being controlled by light controlling means, which in turn controls the time elapsing between the successive operation of the switches.

A further object of my invention is to provide a plurality of magnetically operated switches which are adapted for successive operation and to provide, for controlling the successive operation of said switches, a tube for each switch including a cathode, an anode and a grid, the tubes being so energized as to effect successive operation of the switches.

Further objects and advantages of my invention will appear more fully hereinafter in the appended specification and claims.

For the purpose of disclosing the invention, I have illustrated an embodiment thereof, in the accompanying drawings, in which.

Figures 1, 2:
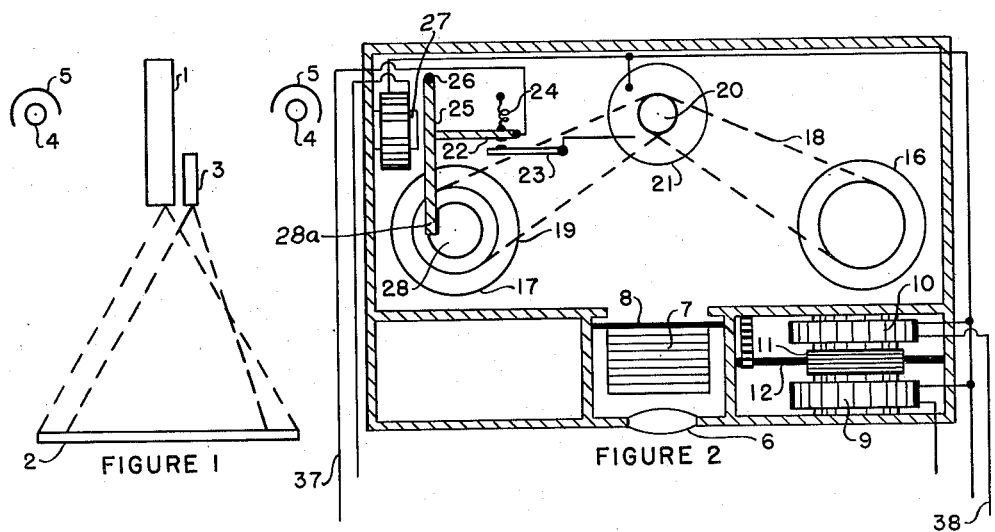
Fig. 1 is an end elevation (more or less diagrammatic) of a microfilm camera and its control mechanism.
Fig. 2 is a longitudinal, section view (more or less diagrammatic) of the operating mechanism of the camera.
Figure 3:
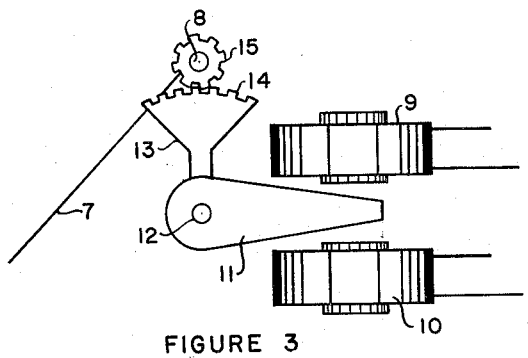
Fig. 3 is an end elevation of the operating mechanism for the camera shutter.
Figure 4:
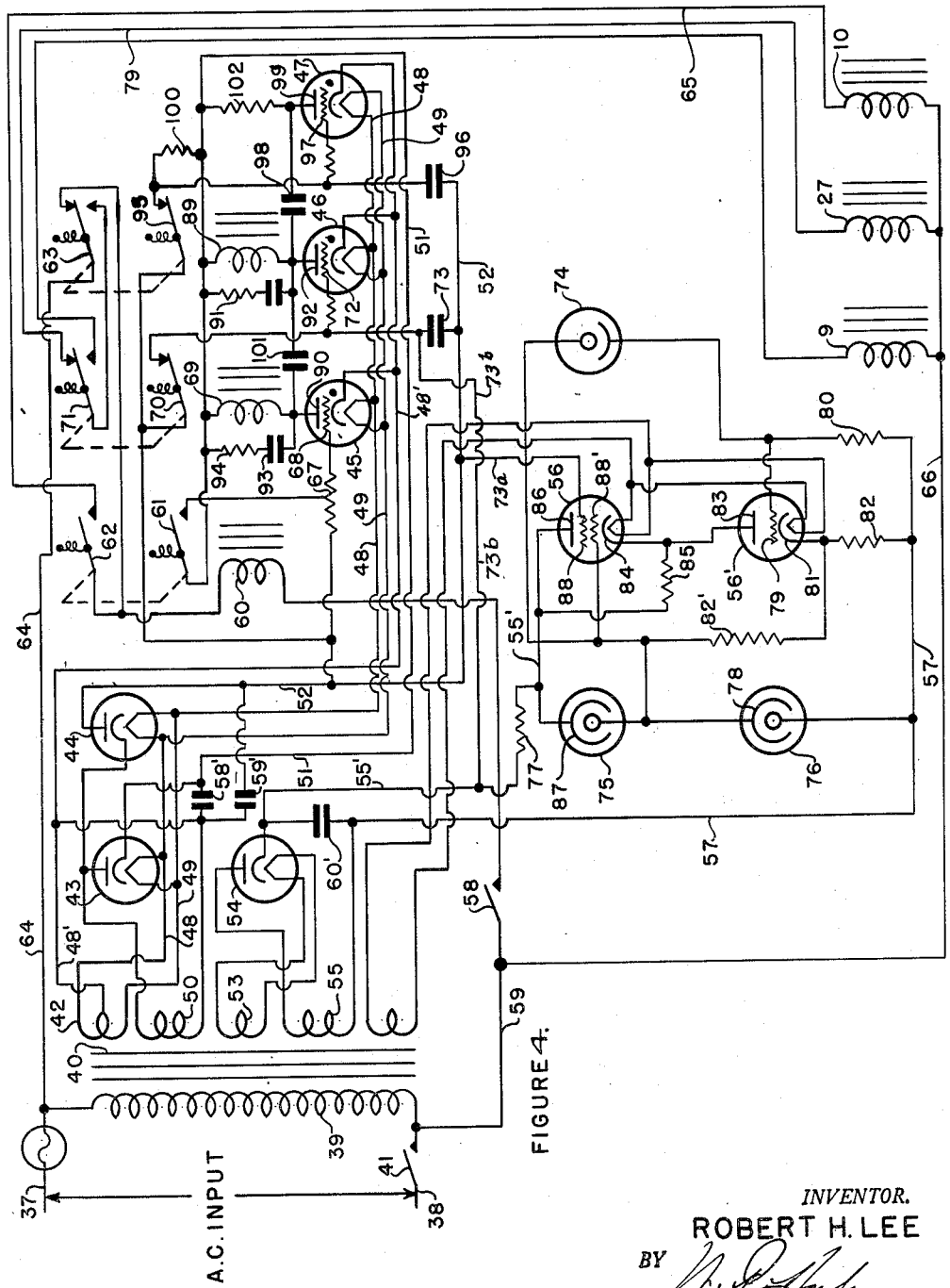
Fig. 4 is a diagrammatic view of the circuit arrangement of the timing control mechanism.

In the embodiment illustrated, having particular reference to Figs. 1 to 4, I provide a microfilm camera 1 suitably supported above the object 2 and alongside the camera, I preferably mount the timing control mechanism 3 so that the light reflected from the object beneath the camera to the timing control will be substantially the same as, if not identical with, that reflected into the lens of the camera. This timing control includes a casing having a small opening in its bottom through which the light reflected from the object is adapted to pass to influence the electric eye forming a part of the timing control. The circuit diagram for the timing control mechanism 3 is shown in Figure 4. For the purpose of providing suitable illumination for the object, I preferably provide on each side of the camera illuminating lamps 4 having associated therewith suitable reflectors 5.

The camera 1 is provided with a suitable lens 6 through which the rays of light pass to impinge upon a film negative mounted within the camera. The admission of light through the lens and onto the negative is controlled by a shutter 7 pivoted to swing on a pivot support or shaft 8. This shutter 7 is adapted to be opened and closed through the medium of suitable electromagnets 9 and 10 between which is mounted an armature 11 carried on a suitable shaft 12, provided with an arm 13 having a rack 14 meshing with a pinion 15 mounted on the shaft 8 carrying the shutter so that as the shaft is rotated in one direction or the other, the shutter will be opened or closed.

The negative film is adapted to be wound from a supply spool 16 onto a receiving spool 17. These respective spools are driven by suitable belt drives 18 and 19 from a pulley 20 of an electric motor 21. The circuit of this electric motor is controlled by a switch including a switch arm 22 and a relatively stationary contact 23. The switch arm 22 is biased in an open position by suitable coil spring 24 and is carried by an arm 25 pivoted at 26. This arm 25 is moved in one direction against the bias of the spring 24 through the medium of an electromagnet 27. The lower end of the arm is adapted to ride on a cam 28 carried on the shaft of the reel 17, which cam has a low spot 28a into which the end of the arm 25 is adapted to drop when the switch arm 25 is in its open position.

In Fig. 4, I have illustrated a diagrammatic view of a circuit arrangement of the various control elements and their circuit relation with one another, for controlling the operation of the different components of the camera. In the circuit arrangement shown, the two leads 37 and 38 which are adapted to be connected with any suitable alternating current supply, in the specific case a 115 volt alternating current supply, are connected to the opposite terminals of the primary winding 39 of a transformer 40 through suitable fuses and through a suitable manually operated control switch 41. A secondary winding 42 of the transformer supplies filament or heater power to rectifying tubes 43 and 44 as well as to the triode gas discharge tubes 45, 46 and 47, by conductors 48 and 49. A winding 50 of the transformer 40 supplies alternating current voltage to the rectifying tubes 43 and 44 which are arranged in a voltage doubler circuit and furnish, in the embodiment illustrated, 150 volt direct current power through neutral conductor 48' and positive conductor 51 to the plate circuits of the gas triodes or tubes 45, 46 and 47, and the double rectifier also supplies negative bias (150 volt direct current) through negative conductor 52 and neutral conductor 48' for control of the grids on the triode tubes 45, 46 and 47. A winding 53 of the transformer 40 supplies filament power to a rectifier tube 54 and a winding 55 of the transformer 40 supplies alternating current voltage to the rectifier tube 54, which supplies through conductor 55' direct current plate power to a tube 56 which is connected in series with a tube 56'. The current return is through the conductor 57. The condensers 58', 59' and 60' are for the purpose of filtering the three direct current output voltages, the condenser 58' being connected across the conductors 48' and 51 and the condenser 59' being connected across the conductors 48' and 52 while the condenser 60' is connected across the conductors 55' and 57.

An exposure cycle is initiated through the momentary closure of the manually operated switch 58 which completes the circuit from the lead or conductor 59 through the coil 60 of a relay controlling switches 61 and 62, through switch 63 back to lead 64. Hereafter reference will be made to the switches controlled by the relays having coils 60, 69 and 89. One position of these switches will be referred to as the "operated position" and the other position of the switches will be referred to as the "released position." The term "operated position" is used to indicate the position of the switches when they are moved from the position illustrated in the drawings downwardly, under the influence of the relays having the coils 60, 69 and 89 and the term "released position" is used to indicate their normal or biased position, that is, the position illustrated in the drawings.

With the switch 62 in closed position, the circuit from the alternating current power source to the solenoid 10 is completed by way of conductor 65 through the switches 62 and 63 and by the return conductor 66, thus energizing solenoid 10 which opens shutter 7. At the same instant, switch 61 also closes the circuit between the positive lead 51 (+150 volt direct current with respect to conductor 48') through the resistor 67 to furnish positive bias on the grid 68 of the tube 45. The tube 45 becomes operative and energizes the coil 69 of the electromagnet controlling the relay switches 70 and 71 to effect operation of these switches, and tube 45, being a gaseous triode, remains operative until its plate voltage is reduced at a later point in the cycle. The operation of the relay switch 71 initiates no action, since it is in series with the lower contact of switch 63 which has not yet been closed. Switch 70 in moving from its normal position disconnects the negative lead 52 (−150 volt direct current with respect to conductor 48') from the grid 72 of the gas triode tube 46, and also removes a short-circuit from around condenser 73 which then becomes charged from the timer circuit through conductors 73a and 73b as will be described in more detail hereinafter. A momentary closure of switch 58 is sufficient to start the cycle because tube 45 becomes operative by a momentary closure of switch contact 61 and the shutter 7 remains open until winding 9 is energized.

The timer control amplifier circuit including tubes 56 and 56' supplies current to the condenser 73 allowing a charge to build up in this condenser 73. The operation of this circuit will be explained later. When this charge has become sufficiently built up, it effects the closure of the camera shutter 7, through the operation of the tube 46, thus shutting off the exposure of the negative. Accordingly, the time it takes for the charge in the condenser 73 determines the length of time of the camera exposure and this build-up time is controlled by an electric eye tube 74 which is subjected to the light reflected from the image and is therefore responsive to the variations in said light. As has heretofore been explained, the timer is arranged in the timer casing 3 disposed beside the camera 1. The electric eye 74 and its associated timing elements for charging condenser 73 are mounted in the casing 3 with the electric eye in such a position relative to a small opening in the bottom of the casing as to receive the light reflected from the object to be photographed, in the same manner as the camera lens receives the light. This is more particularly illustrated in Fig. 1. The photoelectric eye 74 is connected in an amplifier circuit including tubes 56 and 56' which amplifies the current produced in the eye, resulting from the light falling on the screen of the eye, to a value sufficiently high to control the build-up of the charge in the condenser 73.

In this timer control circuit for charging condenser 73, two voltage control or regulator tubes 75 and 76 are connected in series with a resistor 77 across the conductors 55' and 57, and supply constant voltage to the amplifying circuit. The photoelectric tube 74 is connected between the positive terminal 78 of the regulator tube 76 and the control grid 79 of the amplifier tube 56'. The control grid 79 of this amplifier tube 56' is connected to conductor 57 through a resistor 80 of a value sufficient to create suitable variations in the voltage of the grid resulting from current flow from the photoelectric tube 74. The cathode 81 of the amplifier tube 56' is connected to conductor 57 through a resistor 82, which limits the current flow through the amplifier tube. The plate 83 of the amplifier tube 56' is connected to the cathode 84 of the amplifier tube 56. A resistor 82' is connected between the positive terminal 78 of the regulator tube 76 and the cathode 81 of the amplifier tube 56' to provide a bias of such value that the current passing through the amplifier tube 56', when no light is presented to the photoelectric eye 74, will be nearly zero. The plate 86 of the amplifier tube 56 is connected to the positive terminal 87 of the voltage regulator tube 75. The screen grid 88 of the amplifier tube 56 is connected through conductor 73a to the negative bias lead 52, which is connected to one side of the condenser 73. The grid 72 of gas triode 46 is connected to the other terminal of condenser 73 and also to the positive lead 55' through conductor 73b.

Operation of the photo-cell amplifying circuit is as follows: With the camera shutter open, the light reflected from the object energizes the photoelectric eye 74, which in accordance with the well-known characteristic of this type of device, will permit current flow in proportion to the light impinging upon the screen of the eye and the current will flow from the point intermediate regulator tubes 75 and 76, through the photocell 74, and through the resistance 80 to conductor 57. The voltage set up across resistor 80 from the cell 74 is applied to the grid 79 of the amplifier tube 56' and serves to control the current through this tube as well as through the tube 56 in accordance with the light falling on the cell or eye 74. The high positive voltage present on the screen grid 88 of the amplifier tube 56 applied from rectifier 54 through conductor 73b, through condenser 73, and through conductor 73a, attracts the electrons from the cathode 84 of the amplifier tube 56 and the electrons are accelerated and pass through the aforesaid screen grid to impinge upon the plate 86 of the amplifier tube 56. The plate gives up electrons under the bombardment and these are attracted back to the screen grid 88 of the tube 56 and pass to the negative terminal of the condenser 73, building up a voltage across the condenser 73.

When the voltage across the condenser 73 has reached a point sufficiently high to start a current flow in the gas triode 46, current flow will be established through the relay winding 89. With the relay winding 89 energized, the switch 63 is moved to operated position and with switch 71 in operated position, a circuit is established through the electromagnet 9, thus moving the camera shutter to closed position. Upon firing of tube 46, the low resistance path of this tube connects condenser 101 in shunt to tube 45 and the charge on this condenser applies a negative voltage to the plate of tube 45 to de-energize this tube, thereby deenergizing the winding and permitting switches 70 and 71 to move back to normal or open position. A time delay circuit however, is provided to allow current to flow through relay coil 69 for a period of time after current flow ceases through the tube 45 and thus, for a short period of time, maintaining switch 71 closed for a sufficient length of time after the closure of the switch 63 to complete the movement of the shutter 7 to its closed position. Thus for a short interval of time the switch 71 controlled by the relay coil 69 and the switch 63 controlled by the relay coil 89 are both in closed position, allowing current flow from the conductor 66 through the solenoid 9, through the switch 63, through the switch 71, through the conductor 64 as above explained, maintaining the current flow through the winding 9 of the solenoid sufficiently long to complete the closure of the shutter.

The time delay in deenergization of relay coil 69 is accomplished by means of a condenser 93 and a resistor 94 in series, being connected across the relay coil 69. After current flow has ceased through gas triode 45, the discharge current from condenser 93 through resistor 94 keeps the relay coil 69 energized. The period during which the relay coil 69 is sufficiently energized to keep switches 70 and 71 in a closed position is dependent on the capacity of condenser 93, the resistor 94, the resistance of relay coil 69, and the charge which was present on condenser 93 at the instant current flow through gas triode 45 ceased. The said values are pre-set to get the desired amount of delay time in the releasing of switches 70 and 71. This delay time is the time during which solenoid 9, controlling the closure of the camera shutter 7, remains energized.

Immediately after the closing of the shutter has taken place, the relay coil 69 becomes deenergized, thereby releasing switches 70 and 71. The switch 71 completes a circuit from the conductor 64 through the lower contact of switch 63, through the switch 71, through the conductor 79 to the solenoid 27, which operates the switch 22 to close the circuit through the motor 21, driving the film take-up of the camera and thus moving the film one step to present a fresh film for photographic purposes. The motor wind-up is stopped when the cam wheel 28 permits the arm 25 of the motor control switch to drop onto the low spot 28a of the cam wheel, thus opening the switch 22. The circuit through the solenoid 27 is also shut off through the releasing of the switch 63 which is effected when the relay coil 89 is de-energized.

With the switch 95 released, that is with the coil 89 deenergized and switch 95 in its up position, a short circuit will be established around the condenser 96 and accordingly, the condenser will not be receiving a charge. During the time, however, when the relay coil 89 is energized, the switch 95 will be moved to its down position and as a result, the condenser 96 will be connected across the leads 51 and 52, and a charge will be built up in the condenser, due to the potential difference between leads 51 and 52. The control grid 97 of the tube 47 is connected to the condenser 96 and when the charge of the condenser 96 has been built up to reach a sufficient positive value to trigger the control grid 97, current flow will be established through the tube 47. With current flowing through tube 47, the voltage at the plate 92 of the tube 46 is lowered below its sustaining current value by means of the discharge of condenser 98 which is connected between the plate 92 of the tube 46 and the plate 99 of the tube 47, the action being the same as that described above for condenser 101 and serves to extinguish tube 46. As it is desirable to have a certain time delay in the deenergization of the relay coil 89, in which to permit the motor to complete its film take-up action, a resistor 100 is connected in series with the condenser 96. This time delay is for the purpose of allowing time for the switch arm 25 to ride out of the notch in the cam 28.

To further explain the action of the timer circuit, at the instant that switch 95 is caused to open by current flow through the relay coil 89, the circuit from the negative conductor 52 through switch 95 to the grid of gas triode 47 is opened, thus removing a short-circuit from around condenser 96. This allows a charge to build up across condenser 96, resulting from current flow through resistor 100 coming from the positive conductor 51. When the voltage across the condenser 96 has reached the critical point, it allows current flow through the gas triode 47 and through the resistor 102. Firing of tube 47 connects condenser 98 in shunt to tube 46, and this condenser applies a negative voltage to the plate of tube 46 to de-energize it. Thus, the relay coil 89 is deenergized, allowing for releasing of the switches 70 and 71. At this instant, the timer has completed its cycle and is ready for the starting of another cycle. The grid 68 of the gas triode 45, grid 72 of the gas triode 46 and the grid 97 of gas triode 47 are held at a negative potential by connections to conductor 52, which prevents start of current flow through any tube. The gas triode 47 at the end of the cycle is conducting current so that holding the grid at the negative potential does not effect the current flow in this tube. The purpose of gas triode 47, resistor 102 and condenser 98 are purely to quench the current flow in gas triode 46, in order to terminate the cycle. The tube 47 is quenched when tube 45 is re-energized to connect condensers 101 and 98 in shunt to the tube 47, and the charge on condenser 98 applies a negative voltage to the plate of tube 47 to de-energize this tube.

In operation, the color of the light sources and correspondingly, the color of the light reflected from the object vary under different conditions of operation. For instance, a change in voltage in the input line may affect the color characteristic or intensity of the lights 4—4. In order to compensate for this change, I provide a means for controlling the linearity of the amplifying tubes 56 and 56', which consists in properly selecting the characteristic of the tubes and associating with each of the tubes in the cathode circuit respectively resistances 82' and 85. These resistances are so selected as to cut down the response of the tubes 56 and 56' at low light values which effect the tube 74. By this arrangement, I am enabled to compensate for the difference in response to varying color values between the light responsive means 74 on the one hand and the negative on the other.

In order to obtain the above characteristics, in the specific embodiment of my invention illustrated, the tube 56' comprises a 6AC7 tube with the screen grid, the suppressor grid, and the plate tied together to obtain the characteristic of a sharp, cut off triode with the resistance 82 having a value of 2,000 ohms and a resistance 82' having the value of one megohm. Likewise, the tube 56 is a 6AC7 tube with the screen grid and the suppressor grid tied together, and the resistor 85 has the value of one megohm.

Summarizing, the operation of the parts is as follows:

Closing of switch 58 energizes relay coil 60 through upper contacts of switch 63, thereby closing contacts 61 and 62.

Contact 62 operates solenoid 10 to open the shutter. Contact 61 applies positive voltage to the grid 68 of tube 45 to energize relay coil 69 which operates contacts 70 and 71.

Opening of contact 70 removes a short-circuit around condenser 73 which begins to charge from the photocell circuit in a direction to bias the grid 72 in a positive direction. Operation of contact 71 has no effect. As soon as condenser 73 reaches a predetermined charge, tube 46 operates to energize relay winding 89 which operates contacts 63 and 95.

Operation of contact 63 first opens the circuit of relay coil 60 to release contacts 61 and 62, and then completes a circuit through its lower contact and through switch 71 to energize solenoid 9 which moves the shutter to closed position.

Upon firing of tube 46, the low resistance path of this tube connects condenser 101 in shunt to tube 45 and the charge on this condenser applies a negative voltage to the plate of tube 45 to de-energize this tube.

Relay coil 69 is shunted by a delay circuit to maintain this coil energized a sufficient time to allow the shutter to move to completely closed position, and then relay contacts 70 and 71 are released.

Release of contact 70 short-circuits condenser 73 and discharges this condenser. Release of contact 71 de-energizes the shutter closing solenoid 9 and energizes magnet 27 which closes the circuit of the film feeding motor to start the motor into operation.

Opening of contact 95 at the time of operation of relay 89 removes a short-circuit from around condenser 96 and this condenser begins charging through resistance 100. After a predetermined time of sufficient duration to permit the switch arm 25, Figure 2, to ride out of the slot in the cam 28, condenser 96 becomes charged to a value sufficient to cause operation of the tube 47, and this tube applies a negative stopping voltage to the anode of tube 46 from the charge on condenser 98. After a short time determined by the delay circuit in shunt to the coil 89, relay contacts 63 and 95 are released, and release of contact 63 opens the circuit of the motor starting coil 27, but the motor switch 22—23 is maintained closed by the switch arm 25 engaging the cam 28, and the motor continues to operate until the switch arm 25 drops into the slot in the cam.

Release of the relay contacts 63 and 95 places the circuit in condition to start another cycle of operation as described above.

When tube 45 is re-energized, the low resistance path of this tube connects condensers 101 and 98 in shunt to tube 47, and the charge on condenser 98 applies a negative voltage to the plate of tube 47 to de-energize this tube.

The present application is a division of my co-pending application for Automatic Exposure Timer for Cameras, Serial No. 702,124, filed October 9, 1946, now Patent No. 2,577,774.

I claim as my invention:

1. In combination, a pair of grid controlled gas tubes, means normally applying a negative potential to the grids of both tubes, time delay means rendered operative upon the firing of one tube for applying starting potential to the grid of the second tube, and delay-control means including a light sensitive device controlling said time delay means to vary the period of delay with changes in value of light falling on said device.

2. A combination according to claim 1 wherein said delay-control means includes means controlled by said light sensitive device and acting on said delay means to vary the period of delay inversely with the intensity of the light falling on said device.

3. A combination according to claim 1 and including means rendered operative upon energization of the second tube to de-energize the first tube and to apply negative potential to the grid of the second tube.

4. In combination, three grid controlled gas tubes arranged in a series, means normally applying a negative potential to the grids of all three tubes, time delay means rendered operative upon the firing of the first tube to produce firing of the second tube, a second time delay means rendered operative upon firing of the second tube for firing the third tube, and means including a light sensitive device for controlling one of said time delay means to vary the period of delay with variations in the value of light falling on said device.

5. A combination according to claim 4 and including means controlled by the energization of each tube in said series for applying a suppressing voltage to the plate element of the preceding tube of the series.

6. In combination a gas tube having a cathode, a grid, and an anode, a source of biasing voltage, a condenser, a connection from the positive terminal of said source to said cathode, a connection from the negative terminal of said source through said grid, means normally short-circuiting said condenser whereby said tube normally is non-conductive, a source of current for charging said condenser, a connection from the positive terminal of said charging source to the terminal of said condenser connected to said grid, a connection from the other terminal of said condenser to the negative terminal of said charging source including the space current path of a grid-controlled amplifier tube, and a light-sensitive device controlling the conductance of said amplifier tube.

7. In combination, a pair of grid controlled gas tubes, a source of negative potential, connections from said source for applying negative potential to the grids of said tubes whereby said tubes normally are inoperative, an electromagnetic relay connected in the plate circuit of one tube and having a pair of normally closed contacts connected in the biasing grid circuit of the other tube, a condenser connected in shunt to said contacts and normally being shortcircuited, and a connection from the grid of the second tube to a source of positive potential for charging the grid of the second tube positively when said relay becomes energized.

8. A combination according to claim 7 and including a light-sensitive device for controlling the rate of charge of said condenser from said source of positive potential in accordance with the value of light falling on said device.

9. In combination, three grid controlled gas tubes arranged in series, a source of negative potential, connections from said source for applying negative potential to the grids of said tubes whereby said tubes normally are inoperative, an electromagnetic relay connected in the plate circuit of each of the first and second tubes, the switch of the relay of said first tube having a pair of normally closed contacts connected in the grid biasing circuit of the second tube and the switch of the relay connected to the second tube having a pair of normally closed contacts connected in the grid biasing circuit of the third tube, a condenser connected in shunt to each of said pairs of normally closed contacts, connections from a source of positive potential to the grids of the second and third tubes for charging said grids positively when said contacts are open, means for applying a starting potential to the grid of the first tube, and means controlled by the energization of each tube in said series for applying a suppressing voltage to the plate element of the preceding tube of the series.

10. A combination according to claim 9 and including a grid-controlled amplifier tube connected in the connection from said source of positive potential to the grid of said second tube, and a light-sensitive device controlling the conductance of said amplifier tube.

11. In combination, a pair of electromagnetically operated relays each having a normally de-energized operating circuit, time delay means rendered operative upon the operation of one of said relays for energizing the operating circuit of the other of said relays, and means including a light sensitive device controlling said time delay means to vary the period of delay with changes in value of light falling on said device.

12. A relay system comprising first and second electromagnetic relays each having a pair of normally open contacts which close upon energization of the relay, a circuit to be controlled by said relays including both pairs of said normally open contacts connected in series circuit relation therein, means for energizing said first relay, a time delay device controlled by said first relay upon energization thereof for energizing said second relay after a predetermined time delay, and a light-sensitive device controlling said time delay device to vary the period of delay with changes in value of light influencing said light-sensitive device.

ROBERT H. LEE.

REFERENCES CITED

The following references are of record in the file of this patent:

UNITED STATES PATENTS

| Number | Name | Date |
|---|---|---|
| 1,516,646 | Rosely | Nov. 25, 1924 |
| 1,998,950 | Cockrell | Apr. 23, 1935 |
| 2,104,128 | Honaman et al. | Jan. 4, 1938 |
| 2,157,690 | Claugh | May 9, 1939 |
| 2,207,055 | Goodling | July 9, 1940 |
| 2,223,163 | Boeker | Nov. 26, 1940 |
| 2,259,287 | Bendz | Oct. 14, 1941 |
| 2,274,158 | Penther | Feb. 24, 1942 |
| 2,370,727 | Holden | Mar. 6, 1945 |
| 2,414,443 | Busch | Jan. 21, 1947 |
| 2,422,020 | Kingsmill | June 20, 1947 |
| 2,433,254 | Aiken | Dec. 23, 1947 |
| 2,434,101 | Cann | Jan. 6, 1948 |
| 2,451,997 | Undy | Oct. 19, 1948 |
| 2,515,762 | Dimmick | July 18, 1950 |
| 2,538,789 | Maynard | Jan. 23, 1951 |

OTHER REFERENCES

Review of Scientific Instruments, Nov. 1939, pages 323–24.